(12) United States Patent
Yeh

(10) Patent No.: US 10,304,039 B2
(45) Date of Patent: May 28, 2019

(54) PRODUCT DISASSEMBLING METHOD WITH DISASSEMBLING SEQUENCE OPTIMIZATION AND NON-TRANSITORY COMPUTER READABLE MEDIUM THEREOF

(71) Applicant: NATIONAL TSING HUA UNIVERSITY, Hsinchu (TW)

(72) Inventor: Wei-Chang Yeh, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 789 days.

(21) Appl. No.: 14/972,770

(22) Filed: Dec. 17, 2015

(65) Prior Publication Data

US 2017/0024708 A1    Jan. 26, 2017

(30) Foreign Application Priority Data

Jul. 24, 2015    (TW) .............................. 104123998 A

(51) Int. Cl.
*G06F 15/18*    (2006.01)
*G06Q 10/00*    (2012.01)

(52) U.S. Cl.
CPC ............. *G06Q 10/30* (2013.01); *Y02W 90/20* (2015.05)

(58) Field of Classification Search
CPC ............................... G06N 3/126; G06N 3/086
USPC ....................................................... 706/15, 45
See application file for complete search history.

(56) References Cited

U.S. PATENT DOCUMENTS

| 2005/0118612 A1* | 6/2005 | Bonabeau ............... G06N 3/126 435/6.15 |
| 2010/0232533 A1* | 9/2010 | Lee ........................ H04B 7/0417 375/267 |
| 2014/0118561 A1* | 5/2014 | La Lumondiere .......................... G01N 21/9505 348/207.1 |

* cited by examiner

*Primary Examiner* — David R Vincent
(74) *Attorney, Agent, or Firm* — Muncy, Geissler, Olds & Lowe, P.C.

(57) ABSTRACT

A product disassembling method and non-transitory computer readable media thereof are provided. According to the components of the product and the disassembling attributes of the components, the disassembling sequence that minimizes the total disassembling time can be planned. The method includes the following steps: an initial disassembling sequence solution is randomly generated. The disassembling sequence solution is updated by using an update mechanism. The disassembling time of the update disassembling sequence solution is calculated by using a fitness function. The best fitness value is obtained after the continuously updating, so as to determine whether to update or maintain the initial disassembling sequence solution. The corresponding disassembling sequence is considered as the best planning result.

10 Claims, 4 Drawing Sheets

PRODUCT DISASSEMBLING METHOD WITH DISASSEMBLING SEQUENCE OPTIMIZATION AND NON-TRANSITORY COMPUTER READABLE MEDIUM THEREOF

CROSS-REFERENCE TO RELATED APPLICATION

This application claims the benefit of Taiwan Patent Application No. 104123998, filed on Jul. 24, 2015, in the Taiwan intellectual Property Office, the disclosure of which is incorporated herein in its entirety by reference.

BACKGROUND OF THE INVENTION

1. Field of the Invention

The present disclosure generally relates to a product disassembling method and a non-transitory computer readable media thereof, in particular to the method and the non-transitory computer readable media which are feasible to be applied to resolve the disassembling sequence problem of a product by an improved simplified swarm optimization method. According to the product disassembling method and the non-transitory computer readable media thereof, the optimal disassembling sequence can be determined.

2. Description of the Related Art

Currently, as the rise of environmental awareness and responsibility, the enterprise and the producer are gradually aware of the importance of reusing or recycling the products when the service life of the product is ended. Specifically, if the constituent elements or the used materials of a variety of electronic products are not effectively treated, serious damage and heavy pollution to the human living environment become unpreventable. Regarding the process of disassembling products, it is similar to the assembling process of a product. The disassembling sequence of the components of the product has to be arranged and planned adequately to avoid the poor disassembling efficiency and the extra cost to the enterprise, so that the total profit won't be affected.

In view of this, how to plan for the disassembling sequence of the components of the products is of pivotal importance. The conventional disassembling sequence can use particle swarm optimization algorithm or artificial bee colony algorithm to plan the optimal sequence. The particle represents one of the planning solution set, and the position and the velocity of the particle are applied to update the particle solution, Furthermore, the fitness formula is applied to calculate the fitness value to find out the optimal fitness value and then the found optimal fitness value is therefore served as the optimal sequence. However, these conventional computing algorithms are too complicated, and the problems of various data and variables result in increasing the calculation time to obtain a solution of a next generation. Therefore, if the mechanism for generating the solution of the next generation can be simplified, it will effectively reduce the time of operation and enhance the planning efficiency.

As a result, the inventor of the present disclosure has been mulling the technical problems over and then therefore designs a product disassembling method and a non-transitory computer readable media thereof which aim to resolve the existing shortcomings, so as to promote the industrial practicability.

SUMMARY OF THE INVENTION

In view of the aforementioned technical problems, one objective of the present disclosure is to provide a product disassembling method and a non-transitory computer readable media thereof which aim to resolve the technical problem of the conventional disassembling sequence that needs a complicated process of calculation to obtain the optimal planning result.

According to one objective of the present disclosure, a product disassembling method is provided. A disassembling sequence is provided to define the order for disassembling a plurality of components of a product, and a plurality of disassembling attributes of the plurality of components are defined correspondingly. The plurality of disassembling attributes provide the plurality of components with respective disassembling times in the disassembling sequence. The method calculates a minimal disassembling time by a fitness function of the disassembling time of the plurality of components to determine an optimal disassembling sequence. The method includes the following steps: randomly generating an initial disassembling sequence solution of the product, introducing the initial disassembling sequence solution to the fitness function for serving as a swarm optimal fitness value and storing the swarm optimal fitness value by a processor; updating the initial disassembling sequence solution to generate an update disassembling sequence solution of a new generation by an update mechanism and introducing the update disassembling sequence solution to the fitness function to calculate an update fitness value by the processor; comparing the update fitness value with the swarm optimal fitness value by the processor; if the update fitness value is smaller than the swarm optimal fitness value, replacing the initial disassembling sequence solution by the update disassembling sequence solution and updating the swarm optimal fitness value correspondingly, if not, maintaining the initial disassembling sequence solution, continuously updating the update disassembling sequence solution till a stopping criterion is satisfied and considering a last storing result of the swarm optimal fitness value as the optimal disassembling sequence of the product by the processor; and disassembling the product according to the optimal disassembling sequence. Moreover, the update mechanism is updated according to the following steps: generating a random probability value corresponding to the initial disassembling sequence solution by the processor, and the random probability value between 0 and 1; updating the initial disassembling sequence solution according to the following formula:

$$x_{ij}^{t+1} = \begin{cases} x_{ij}^t + \rho \cdot u_j & \text{if } x_{ij}^t = g_j \text{ or } \rho \in [0, C_r] \\ g_j + \rho \cdot u_j & \text{if } x_{ij}^t \neq g_j \text{ and } \rho \in [C_r, C_g] \\ x_{ij}^t + \rho \cdot (x_{ij}^t - g_j) & \text{if } x_{ij}^t \neq g_j \text{ and } \rho \in [C_g, 1] \end{cases}$$

Here, $x_{ij}$ is $i^{th}$ solution of $j^{th}$ component in the initial disassembling sequence solution; t is a generation number; $\rho$ is the random probability value; $g_j$ is an optimal fitness value of the $j^{th}$ component; $u_j$ is an intervening variable, and the intervening variable is calculated by using a difference of an upper limit value and a lower limit value to divide a double amount of a component; $C_r$ an $C_g$ are applied to determine a predetermined threshold value in an update interval of the random probability value; and if an updated solution exceeds in the upper limit value or the lower limit value of the disassembling sequence, the upper limit value or the lower limit value is served as the update disassembling sequence solution of the next generation.

Preferably, the plurality of disassembling attributes of the plurality of components may include a disassembling direction, a disassembling method, a post-disassembling need and a component composition.

Preferably, the fitness function of the disassembling attribute may include the following formula:

$$F(X)=t_1+\Sigma_{k=2}{}^n T(B_{j,k})+\Sigma_{k=2}{}^n T(D_{j,k})+\Sigma_{k=2}{}^n T(M_{j,k})$$

Here, $t_1$ is a disassembling time of a component in a first disassembling sequence; $T(B_{j,k})$ is an updated disassembling time of the $j^{th}$ component after a second disassembling sequence; $T(D_{j,k})$ is a penalty time of the $j^{th}$ component changing the disassembling direction after the second disassembling sequence; and $T(M_{j,k})$ is a penalty time of the $j^{th}$ component changing the disassembling method after the second disassembling sequence.

Preferably, an updated disassembling time may include the following formula:

$$T(B_{j,k})=t_j k^\alpha$$

Here, $\alpha$ is a learning index, and the disassembling time of the $j^{th}$ component in a $k^{th}$ disassembling sequence is updated by the learning index.

Preferably, the stopping criterion may include an updated number which is up to a predetermined generation number, a calculation time which is up to a predetermined processing time or the optimal fitness value which is not changed when the updated number exceeds a predetermined number.

According to another objective of the present disclosure, a non-transitory computer readable media is provided for disassembling of a product. A disassembling sequence being provided to define the order for disassembling a plurality of components of the product, and a plurality of disassembling attributes of the plurality of components are defined correspondingly. The plurality of disassembling attributes provide the plurality of components with respective disassembling times in the disassembling sequence. An algorithm is stored in the non-transitory computer readable media, so that a minimal disassembling time is calculated by a fitness function of the disassembling time of the plurality of components to determine an optimal disassembling sequence. The optimal disassembling sequence is used for disassembling of the product. The algorithm includes the following steps while being executed by a computer: randomly generating an initial disassembling sequence solution of the product, introducing the initial disassembling sequence solution to the fitness function for serving as a swarm optimal fitness value and storing the swarm optimal fitness value; updating the initial disassembling sequence solution to generate an update disassembling sequence solution of a new generation by an update mechanism and introducing the update disassembling sequence solution to the fitness function to calculate an update fitness value; comparing the update fitness value with the swarm optimal fitness value; if the update fitness value is smaller than the swarm optimal fitness value, replacing the initial disassembling sequence solution by the update disassembling sequence solution and updating the swarm optimal fitness value correspondingly, if not, maintaining the initial disassembling sequence solution; continuously updating the update disassembling sequence solution till a stopping criterion is satisfied and considering a last storing result of the swarm optimal fitness value as the optimal disassembling sequence of the product; and issuing a disassembling instruction such that the product is disassembled in accordance with the optimal disassembling sequence. Moreover, the update mechanism is updated according to the following steps: generating a random probability value corresponding to the initial disassembling sequence solution by the processor, and the random probability value between 0 and 1; updating the initial disassembling sequence solution according to the following formula:

$$x_{ij}^{t+1} = \begin{cases} x_{ij}^t + \rho \cdot u_j & \text{if } x_{ij}^t = g_j \text{ or } \rho \in [0, C_r] \\ g_j + \rho \cdot u_j & \text{if } x_{ij}^t \neq g_j \text{ and } \rho \in [C_r, C_g] \\ x_{ij}^t + \rho \cdot (x_{ij}^t - g_j) & \text{if } x_{ij}^t \neq g_j \text{ and } \rho \in [C_g, 1] \end{cases}$$

Here, $x_{ij}$ is $i^{th}$ solution of $j^{th}$ component in the initial disassembling sequence solution; t is a generation number; $\rho$ is the random probability value; $g_j$ is an optimal fitness value of the $j^{th}$ component; $u_j$ is an intervening variable, and the intervening variable is calculated by using a difference of an upper limit value and a lower limit value to divide a double amount of a component; $C_r$, an $C_g$ are applied to determine a predetermined threshold value in an update interval of the random probability value; and if an updated solution exceeds in the upper limit value or the lower limit value of the disassembling sequence, the upper limit value or the lower limit value is served as the update disassembling sequence solution of the next generation.

Preferably, the plurality of disassembling attributes of the plurality of components may include a disassembling direction, a disassembling method, a post-disassembling need and a component composition.

Preferably, the fitness function of the disassembling attribute may include the following formula:

$$F(X)=t_1 \Sigma_{k=2}{}^n T(B_{j,k})+\Sigma_{k=2}{}^n T(D_{j,k})+\Sigma_{k=2}{}^n T(M_{j,k})$$

Here, $t_1$ is a disassembling time of a component in a first disassembling sequence; $T(B_{j,k})$ is an updated disassembling time of the $j^{th}$ component after a second disassembling sequence; $T(D_{j,k})$ is a penalty time of the $j^{th}$ component changing the disassembling direction after the second disassembling sequence; and $T(M_{j,k})$ is a penalty time of the $j^{th}$ component changing the disassembling method after the second disassembling sequence.

Preferably, an updated disassembling time may include the following formula:

$$T(B_{j,k})=t_j k^\alpha$$

Here, $\alpha$ is a learning index, and the disassembling time of the $j^{th}$ component in a $k^{th}$ disassembling sequence is updated by the learning index.

Preferably, the stopping criterion may include an updated number which is up to a predetermined generation number, a calculation time which is up to a predetermined processing time or the optimal fitness value which is not changed when the updated number exceeds a predetermined number.

As mentioned previously, a product disassembling method and a non-transitory computer readable media thereof of the present disclosure may have one or more advantages as follows.

1. By means of the update mechanism, the product disassembling method and the non-transitory computer readable media thereof of the present disclosure are able to reduce the complexity of computing systems so as to enhance the operation speed of planning the disassembling sequence.

2. The product disassembling method and the non-transitory computer readable media thereof of the present disclosure are able to update the disassembling sequence in accordance with a random probability and to add the adjustment intervening variables based on the random probability, such that the optimal solution is not limited to a local optimal solution while calculating and the accuracy of planning results are hereby improved.

3. By means of setting the stopping criterion adequately, the product disassembling method and the non-transitory computer readable media thereof of the present disclosure are able to avoid the system consuming too many resources on unnecessary update calculation, such that the optimal plan can be found when the pre-conditions are satisfied, so as to improve planning effectiveness.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. On the other hand, the diagrams used herein are merely intended to be schematic and auxiliary to the specification, but are not necessary to be true scale and precise configuration after implementing the present disclosure. Thus, it should not be interpreted in accordance with the scale and the configuration of the accompanying drawings to limit the scope of the present disclosure on the practical implementation.

In accordance with the embodiment(s) of the present disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk chive, and the like), optical storage medium (e.g., CD-ROM, DVD-ROM, paper card and paper tape, and the like) and other known types of program memory.

Figure 1:
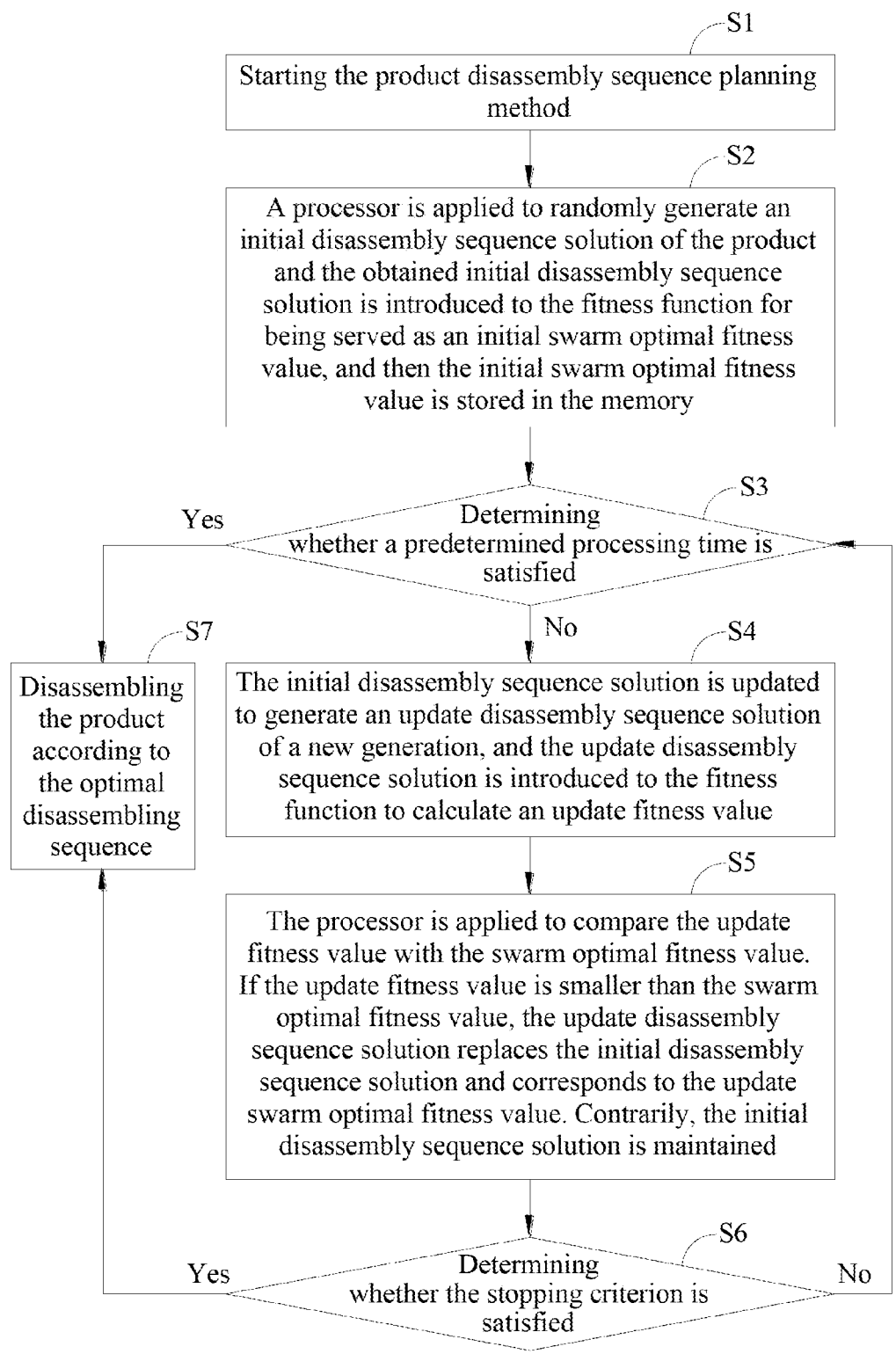
FIG. 1 is a flow chart of a product disassembling method of the present disclosure.

Please refer to FIG. 1 which is a flow chart of a product disassembling method of the present disclosure. As shown in the figure, the product disassembling method includes the following steps (S1-S7).

Step S1: Starting the product disassembling method. Firstly, the components of a product which are going to be analyzed are stored in a memory. The different components have different disassembling attributes such as a disassembling direction, a disassembling method, a post-disassembling need and a component composition. These disassembling attributes indicate that the components have different disassembling times in different disassembling sequences, and the components including related attributes are stored in the memory. Afterwards, a fitness function with respect to the disassembling time is established based on these attributes and the totally disassembling time for the components is calculated according to the fitness function. The shorter the disassembling time takes the lower expenditure the disassembling costs. So, the minimum fitness function is served as the optimal planning result for the disassembling sequence of the produce.

Step S2: A processor is applied to randomly generate an initial disassembling sequence solution of the product and the obtained initial disassembling sequence solution is introduced to the fitness function for being served as an initial swarm optimal fitness value, and then the initial swarm optimal fitness value is stored in the memory. A system processor randomly generates an arrange sequence according to each component of the produce, for example, $X_1^1 = x_{1,1}^1, x_{1,2}^1, \ldots, x_{1,n}^1) = (3,1, \ldots, 8)$ indicates the first solution set of an initial generation (t=1). Here, the product includes $n^{th}$ components, and the randomly generated sequence (3, 1 . . . , 8) means the disassembling sequence of the components. For example, a numerical value 3 is denoted that the component 1 is in the third disassembling position or the disassembling sequence is 3. $X_1^1$ is introduced to the fitness function F to calculate a numerical value $f(X_1^1)$ of the fitness function F for being served as the initial swarm optimal value, called gbest.

Step S3: Determining whether a predetermined processing time is satisfied. If so, executing step S7, and if not, continuing to step S4. It is essential for the soft computing to set a standard to determine whether a product disassembling method reaches to a stopping criterion. Setting the stopping criterion in advance facilitates the system stopping to calculate continuously when an optimal solution is found in an acceptable range, so that it can avoid unnecessary calculation consuming the planning time. Here, when the calculation time reaches to a threshold value, it can set the calculation time of the system processor. For example, when the processor started to calculate after 1.25 seconds, the update is stopped. The stopping criterion enables the system to have an optimal planning result within a predetermined time. So, it can set different threshold values according to the components including different disassembling attributes or the product having different numbers of components to meet the character of the product.

Step S4: The initial disassembling sequence solution is updated to generate an update disassembling sequence solution of a new generation, and the update disassembling sequence solution is introduced to the fitness function to calculate an update fitness value. When the calculation time does not reach to the threshold value yet, the processor updates the original initial disassembling sequence solution by the update mechanism. For example, $X_1^2 = (x_{1,1}^2, x_{1,2}^2, \ldots, x_{1,n}^2)$ indicates an update solution set of the first update generation (t=2). Similarly, $X_1^2$ is introduced to the fitness function F to calculate the update numerical value $f(X_1^2)$ of the fitness function F. The update mechanism mentioned herein will be detailed in the following paragraph.

Step S5: The processor is applied to compare the update fitness value with the swarm optimal fitness value. If the update fitness value is smaller than the swarm optimal fitness value, the update disassembling sequence solution replaces the initial disassembling sequence solution and corresponds to the update swarm optimal fitness value. Contrarily, the initial disassembling sequence solution is maintained. As mentioned previously, the update fitness value $f(X_1^2)$ derived from the calculation is compared with the original swarm optimal fitness value $f(X_1^2)$ to obtain the fitness function which means a total disassembling time of the product. Consequently, the lower the numeral value is the better the solution works. When $f(X_1^2)$ is lower than $f(X_1^1)$, the update disassembling solution $X_1^2$ replaces the initial disassembling solution $X_1^1$, and the swarm optimal fitness value is updated as $f(X_1^2)$. Contrarily, if a total disassembling time of $f(X_1^2)$ is larger than $f(X_1^1)$, the update disassembling solution $X_1^2$ is abandoned. Ending the calculation or generating the update disassembling sequence solution of next new generation again depends on the stopping criterion.

Step S6: Determining whether the stopping criterion is satisfied. If so, executing step S7, and if not, returning to step S3. After the comparison of the update disassembling sequence solution is completed, it can confirm again whether the stopping criterion is satisfied. Here, the stopping criterion can be set to differ from that used in step S3. For instance, if the number of the predetermined update is completed, the product disassembling method is ended. If the number is not completed, it returns to step S3 to examine whether the calculation time exceeds in the predetermined processing time to decide a further update is necessary. In addition, the stopping criterion of the present embodiment may be set to examine the swarm optimization value after updating the predetermined number. If the swarm optimization value is not changed after numerous update, it is regarded as the optimal planned solution. And the update is ended. The stopping criterion mentioned herein may cooperate with that applied step S3, and alternatively, one of the stopping criterions may be used independently for stopping the calculation to obtain the optimal disassembling sequence.

Step S7: Disassembling the product according to the optimal disassembling sequence. When the stopping criterion of step S3 or step S6 is satisfied, the process of the product disassembling sequence planning method is ended. And the swarm optimal fitness value stored in the memory is served as the optimal disassembling sequence. The product disassembling sequence may be arranged by the optimal disassembling sequence. For example, the planner arranges the position of the operators in the disassembling production line and each of the operators disassembles the different components according to the order of the optimal disassembling sequence. The product will be divided into desirable part in the minimum time to reduce the disassembling cost. Moreover, the disassembling line can be arranged by different disassembling devices, such as the modular jig and fixture or the grinder, so that the disassembling process can be effectively conducted.

Figure 2:
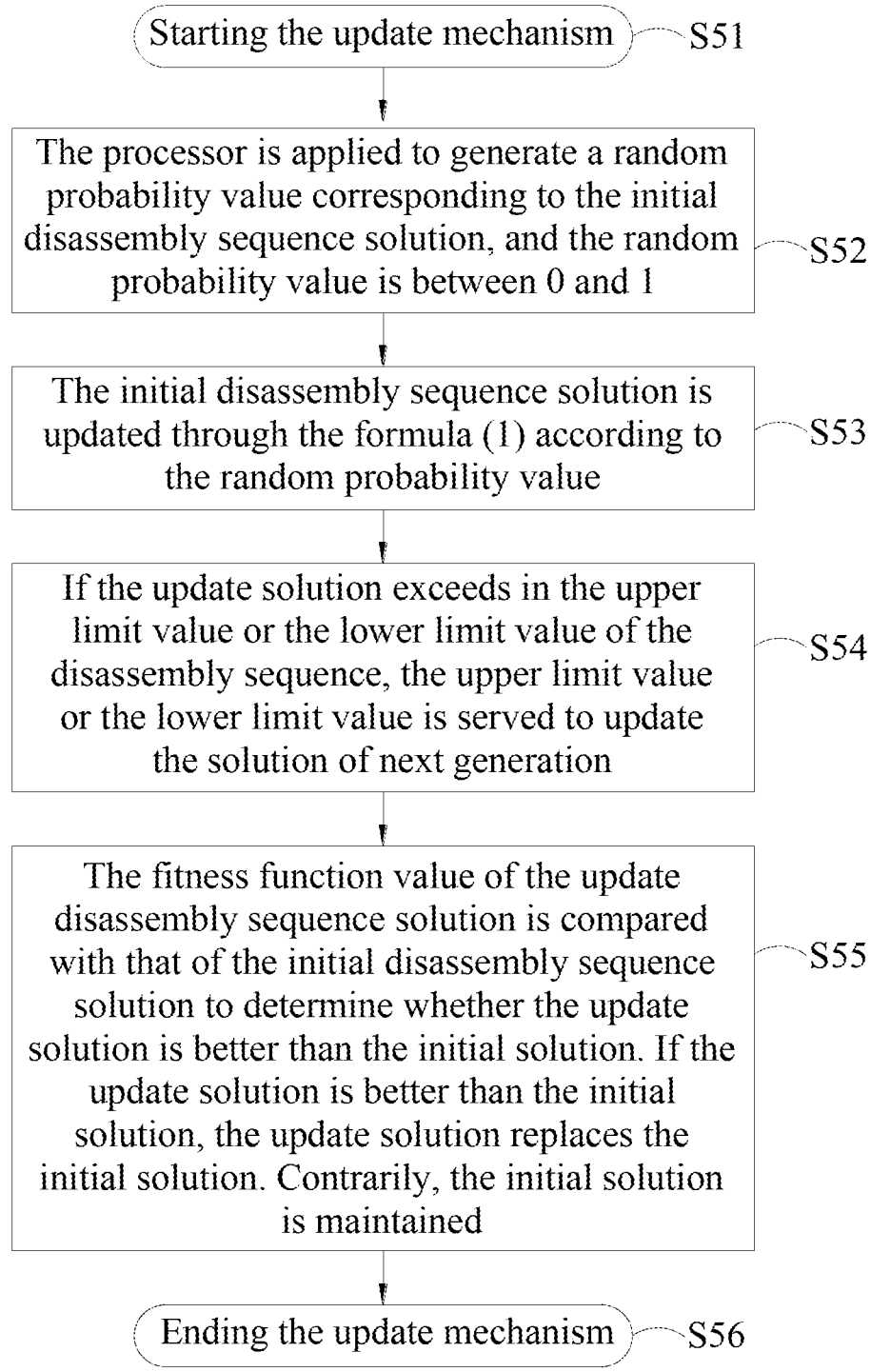
FIG. 2 is a flow chart of an update mechanism of the present disclosure.

Please refer to FIG. 2 which is a flow chart of an update mechanism of the present disclosure. As shown in the figure, the update mechanism applied in the product disassembling method includes the following steps (S51-S56).

Step S51: Starting the update mechanism. By combining with the steps stated in the foregoing embodiment, the processor generates randomly an initial disassembling sequence solution. The initial disassembling sequence solution indicates the first possible planned process of the update mechanism. By means of continuously updating the content of the process, a better sequence process can be found.

Step S52: The processor is applied to generate a random probability value corresponding to the initial disassembling sequence solution, and the random probability value is between 0 and 1. A random probability value $\rho=(\rho_1, \rho_2, \ldots, \rho_n)$ is generated according to each component of the initial disassembling sequence solution $X_1^1=(x_{1,1}^1, x_{1,2}^1, \ldots, x_{1,n}^1)$. The random probability value is between 0 and 1 and served as the comparing standard of the follow-up update disassembling sequence solution and adjusting the intervening variable of the travel distance around each solution.

Step S53: The initial disassembling sequence solution is updated through the formula (1) according to the random probability value.

$$x_{ij}^{t+1} = \begin{cases} x_{ij}^t + \rho \cdot u_j & \text{if } x_{ij}^t = g_j \text{ or } \rho \in [0, C_r] \\ g_j + \rho \cdot u_j & \text{if } x_{ij}^t \neq g_j \text{ and } \rho \in [C_r, C_g] \\ x_{ij}^t + \rho \cdot (x_{ij}^t - g_j) & \text{if } x_{ij}^t \neq g_j \text{ and } \rho \in [C_g, 1] \end{cases} \quad (1)$$

Here, $x_{ij}$ is $i^{th}$ solution of $j^{th}$ component in the initial disassembling sequence solution and t is a generation number. Take the present embodiment for example; the $n^{th}$ component in the initial disassembling sequence solution $X_1^1=(x_{1,1}^1, x_{1,2}^1, \ldots, x_{1,n}^1)$ is updated to be $X_1^2=(x_{1,1}^2, x_{1,2}^2, \ldots, x_{1,n}^2)$. The first component is applied to explain that the standard of the update is determined according to the probability value $\rho$ As shown in formula (1), when the disassembling sequence value $x_{1,1}^1$ of the first component is the optimal fitness value $g_1$ or the random probability value $\rho_1$ is between 0 and $C_r$, the update solution is $x_{1,1}^1+\rho \cdot u_1$, wherein is an intervening variable $u_1$ and calculated by formula (2).

$$u_j = \frac{x_j^{min} - x_j^{max}}{2 \cdot N_{var}} \quad (2)$$

Here, $x_j^{min}$ is denoted as a lower limit value of the solution. $x_j^{max}$ is denoted as a upper limit value of the solution. $N_{var}$ is a number of the intervening variables which indicates an amount of the components. The update disassembling sequence value is the initial sequence value adding a product of the random probability value and the intervening variable. Such manner facilitates to find out more workable solutions around the original solution. By means of such manner, it can encompass various probabilities to the calculation. Furthermore, the manner can avoid mistaking the solution which falls in the local optimal solutions as the total optimal solution, so as to reduce the accuracy of the calculation.

As mentioned previously, when the random probability value $\rho_1$ is between $C_r$ and $C_g$, $g_1+\rho \cdot u_1$ is regarded as the update solution, that is, the swarm optimal fitness value adding a produce of the random probability value and the intervening variable. When the random probability value $\rho_1$ is between $C_g$ and 1, $x_{1,1}^1+\rho \cdot (x_{1,1}^1-g_1)$ is served as the update solution, that is, the initial sequence value adding the product of the difference of the initial sequence value and the optimal fitness value. $C_r$ and $C_g$ are denoted to determine a predetermined threshold value in the update interval of the random probability value. The threshold value is further adjusted according to different products and numbers of components to match the update mechanism.

Step S54: If the update solution exceeds in the upper limit value or the lower limit value of the disassembling sequence, the upper limit value or the lower limit value is served to update the solution of next generation. When performing the update of the disassembling sequence solution, it has to consider the original the upper limit value or lower limit value. After updating, if the update value exceeds in the upper limit value $x_j^{max}$, such upper limit value is the update solution of the new generation. Similarly, if the update value is smaller than the lower limit value $x_j^{min}$, such lower limit value is regarded as the update solution of the new generation. The step is to avoid the update process going beyond the original limiting condition, resulting that the found solution cannot satisfy with the original requirement and thus becomes invalid.

Step S55: The fitness function value of the update disassembling sequence solution is compared with that of the initial disassembling sequence solution to determine whether the update solution is better than the initial solution. If the update solution is better than the initial solution, the update solution replaces the initial solution. Contrarily, the initial solution is maintained. Introducing the update disassembling sequence solution to the fitness function can obtain the update fitness function value. And the update fitness function value of the present embodiment for example is the total disassembling time. So, if the update fitness function value is lower than that of the initial solution, it means that the update solution is capable of planning a shorter disassembling time, so that the update disassembling sequence solution replaces the initial disassembling sequence solution.

Step S56: Ending the update mechanism. Whenever the update mechanism is updated, each result is stored in the memory. The update results are served to determine whether the stopping criterion is satisfied to decide if updating the update mechanism again is necessary to generate the disassembling sequence solution of a new generation.

Figure 3:
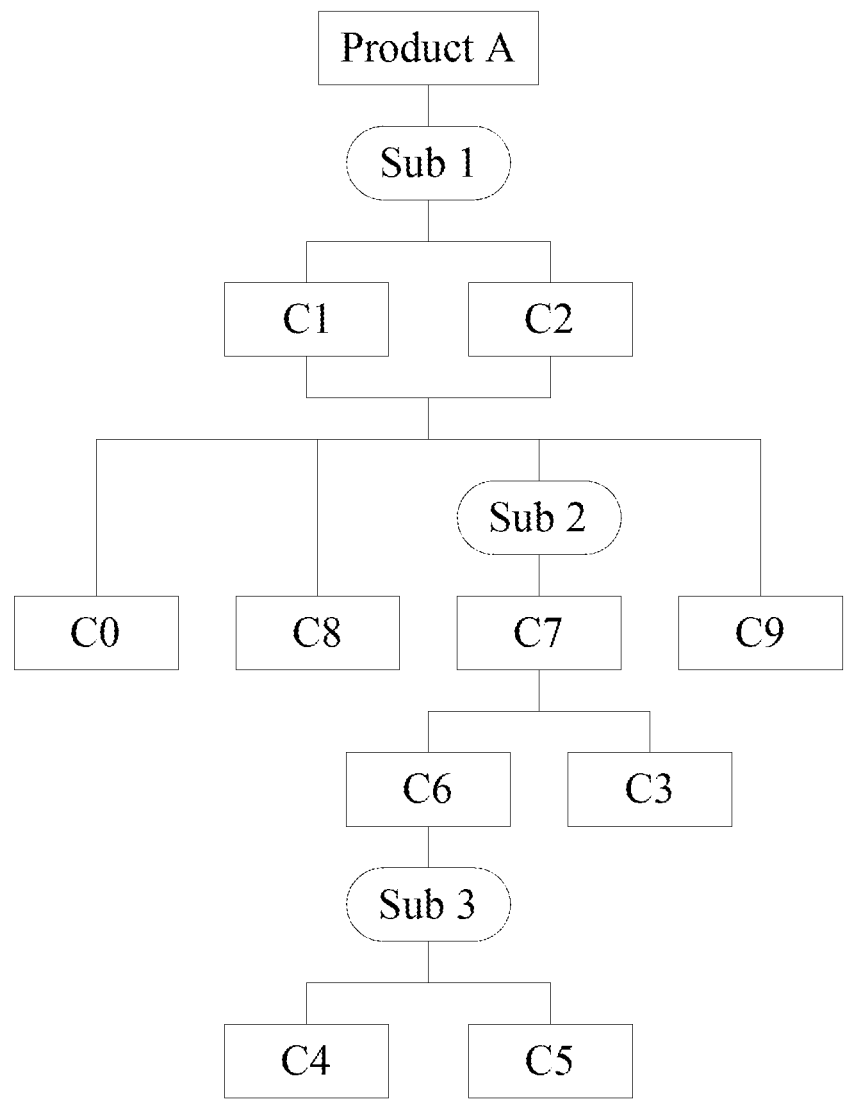
FIG. 3 is a schematic diagram of a product disassembling sequence of the present disclosure.

Please refer to FIG. 3 which is a schematic diagram of a product disassembling sequence of the present disclosure. As shown in the figure, the product A includes the components C0-C9 and the structure thereof can be referred to the same figure. Each component further includes limiting condition of the disassembling relationship. For example, the disassembling limit Sub1 refers that the component C1 and the component C2 must be disassembled before the other components. The disassembling limit Sub2 refers that the component C7 must be disassembled before the component C3 and the component C6. The disassembling limit Sub3 refers that the component C6 must be disassembled before the component C4 and the component C5. Consequently, when performing the disassembling sequence of the component, it has to consider that the foregoing limiting conditions have satisfied with the actual requirements.

In addition to the aforementioned disassembling limits, each component has individual disassembling attribute. Besides the disassembling time of the component, the disassembling attribute further includes a disassembling direction, a disassembling method, a post-disassembling need and a component composition. The disassembling time indicates the time which is essential to complete the disassembling process of the component. In addition to the original disassembling time, the disassembling time may be quickened according to the learning effect. Hence, the formula (3) is applied to calculate the change of the disassembling time.

$$T(B_{j,k}) = t_j k^\alpha \quad (3)$$

Here, $\alpha$ is a learning index, and the disassembling time of the $j^{th}$ component in a $k^{th}$ disassembling sequence is updated by the learning index. For example, if a learning curve is 80%, $\alpha$ may be $-0.322$. The change of the disassembling time is calculated according to such manner.

Besides, the disassembling direction indicates the disassembling direction of the component in three-dimensional space, and it includes directions of +x, −x, +y, −y, +x and −z. When disassembling, changing the disassembling direction may cause the increase of the disassembling time. The disassembling method may be a destructive disassembling and a non-destructive disassembling. Similarly, changing the disassembling method also lead to the increase of the disassembling time. Moreover, the post-disassembling need means whether the disassembled component is to throw away, reuse or recycle. The component composition includes materials such as aluminum, plastic, steel, and so on. The aforementioned disassembling attributes all affect the disassembling time of each component and further to influence the total disassembling time of the disassembling sequence.

$$F(X) = t_1 + \Sigma_{k=2}^n T(B_{j,k}) + \Sigma_{k=2}^n T(D_{j,k}) + \Sigma_{k=2}^n T(M_{j,k}) \quad (4)$$

Here, $t_1$ is a disassembling time of a component in a first disassembling sequence; $T(B_{j,k})$ is an updated disassembling time of the $j^{th}$ component after a second disassembling sequence; $T(D_{j,k})$ is a penalty time of the $j^{th}$ component changing the disassembling direction after the second disassembling sequence; and $T(M_{j,k})$ is a penalty time of the $j^{th}$ component changing the disassembling method after the second disassembling sequence. The fitness function indicates that the first disassembling sequence is calculated based on the original disassembling time, and the follow-up disassembling process has to take the time change resulted from the learning effect into consideration. Besides, in the total disassembling time, the change of the disassembling time due to the changes of the disassembling direction and the disassembling method has to be considered. Hence, the fitness function can calculate the time which is essential to complete the disassembling process. By means of the update solution of different generations derived from the product disassembling sequence planning method, it can introduce the disassembling time generated from the fitness function to determine whether the solution of each disassembling sequence is the optimal sequence plan.

Figure 4:
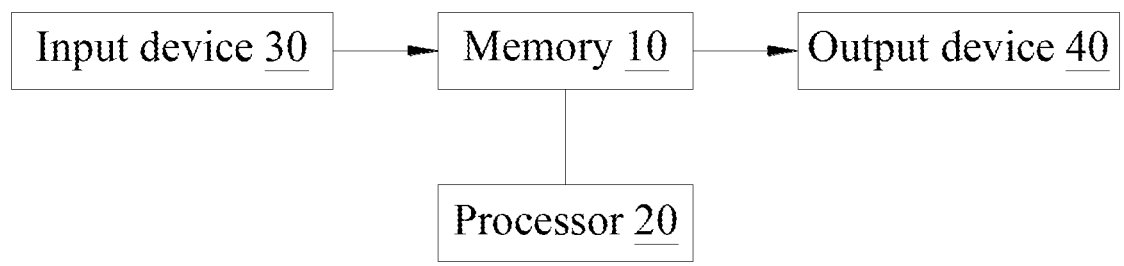
FIG. 4 is a schematic diagram of a product disassembling system of the present disclosure.

Please refer to FIG. 4 which is a schematic diagram of a product disassembling system of the present disclosure. As shown in the figure, the product disassembling system includes a memory 10 and a processor 20. The memory may be a non-transitory computer readable media. Components of various products and disassembling attributes of the components are stored in the memory 10 through an input device 30. The input device 30 includes input interfaces such as an induction type or a touch type. The processor 20 is connected to the memory 10 to access the disassembling information related to the components of the product and then plans the disassembling sequence according to an algorithm stored in the memory 10, wherein the algorithm is the treatment process as shown in FIG. 1. The calculation result derived from the processor 20 is the optimal disassembling sequence, and the optimal disassembling sequence is output by an output device 40. The output device 40, which is a display applied to display the evaluation result, may be the display screen such as LCD, LED or OLED, and alternatively, may be a cable or wireless network transmitter. The output device 40 transmits the planning result to the operating personnel, such that the operating personnel are able to disassemble the product according to the planned disassembling sequence. In addition, the output device 40 may transmit the optimal disassembling sequence as a disassembling instruction to the disassembling production line, so as to arrange the operators and the disassembling devices in the optimal order. As a result, the disassembling process of the product can be completed with an optimal operation time to thereby promote the disassembling efficiency and to avoid the unnecessary waste of the time cost.

While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:

1. A product disassembling method, with a disassembling sequence being provided to define order for disassembling a plurality of components of a product, and with a plurality of disassembling attributes of the plurality of components defined correspondingly, the plurality of disassembling attributes providing the plurality of components with respective disassembling times in the disassembling sequence, the method calculating a minimal disassembling time by a fitness function of the disassembling time of the plurality of components to determine an optimal disassembling sequence, and the method comprising the following steps:

randomly generating an initial disassembling sequence solution of the product, introducing the initial disassembling sequence solution to the fitness function for serving as a swarm optimal fitness value and storing the swarm optimal fitness value by a processor;

updating the initial disassembling sequence solution to generate an update disassembling sequence solution of a new generation by an update mechanism and introducing the update disassembling sequence solution to the fitness function to calculate an update fitness value by the processor;

comparing the update fitness value with the swarm optimal fitness value by the processor; if the update fitness value is smaller than the swarm optimal fitness value, replacing the initial disassembling sequence solution by the update disassembling sequence solution and updating the swarm optimal fitness value correspondingly, if not, maintaining the initial disassembling sequence solution;

continuously updating the update disassembling sequence solution till a stopping criterion is satisfied and considering a last storing result of the swarm optimal fitness value as the optimal disassembling sequence of the product by the processor; and disassembling the product according to the optimal disassembling sequence;

wherein, the update mechanism is updated according to the following steps:

generating a random probability value corresponding to the initial disassembling sequence solution by the processor, and the random probability value between 0 and 1;

updating the initial disassembling sequence solution according to the following formula:

$$x_{ij}^{t+1} = \begin{cases} x_{ij}^t + \rho \cdot u_j & \text{if } x_{ij}^t = g_j \text{ or } \rho \in [0, C_r] \\ g_j + \rho \cdot u_j & \text{if } x_{ij}^t \neq g_j \text{ and } \rho \in [C_r, C_g] \\ x_{ij}^t + \rho \cdot (x_{ij}^t - g_j) & \text{if } x_{ij}^t \neq g_j \text{ and } \rho \in [C_g, 1] \end{cases}$$

wherein, $x_{ij}$ is $i^{th}$ solution $j^{th}$ component in the initial disassembling sequence solution; t is a generation number; $\rho$ is the random probability value; $g_j$ is an optimal fitness value of the $j^{th}$ component; $u_j$ is an intervening variable, and the intervening variable is calculated by using a difference of an upper limit value and a lower limit value to divide a double amount of a component; $C_r$, an $C_g$ are applied to determine a predetermined threshold value in an update interval of the random probability value; and if an updated solution exceeds in the upper limit value or the lower limit value of the disassembling sequence, the upper limit value or the lower limit value is served as the update disassembling sequence solution of the next generation;

wherein the product comprises electronic products and the electronic products are disassembled to the plurality of components comprising aluminum, plastic and steel according to the optimal disassembling sequence.

2. The product disassembling method of claim 1, wherein the plurality of disassembling attributes of the plurality of components comprise a disassembling direction, a disassembling method, a post-disassembling need and a component composition.

3. The product disassembling method of claim 2, wherein the fitness function of the disassembling attribute comprises the following formula:

$$F(X) = t_1 + \sum_{k=2}^{n} T(B_{j,k}) + \sum_{k=2}^{n} T(D_{j,k}) + \sum_{k=2}^{n} T(M_{j,k})$$

wherein, $t_1$ is a disassembling time of a component in a first disassembling sequence; $T(B_{j,k})$ is an updated disassembling time of the $j^{th}$ component after a second disassembling sequence; $T(D_{j,k})$ is a penalty time of the $j^{th}$ component changing the disassembling direction after the second disassembling sequence; and $T(M_{j,k})$ is a penalty time of the $j^{th}$ component changing the disassembling method after the second disassembling sequence.

4. The product disassembling method of claim 3, wherein an updated disassembling time comprises the following formula: $T(B_{j,k}) = t_j k^\alpha$ wherein, $\alpha$ is a learning index, and the disassembling time of the $j^{th}$ component in a $k^{th}$ disassembling sequence is updated by the learning index.

5. The product disassembling method of claim 1, wherein the stopping criterion comprises an updated number which is up to a predetermined generation number, a calculation time which is up to a predetermined processing time or the optimal fitness value which is not changed when the updated number exceeds a predetermined number.

6. A non-transitory computer readable media for disassembling of a product, with a disassembling sequence being provided to define the order for disassembling a plurality of components of the product, and with a plurality of disassembling attributes of the plurality of components defined correspondingly, the plurality of disassembling attributes providing the plurality of components with respective disassembling times in the disassembling sequence, the non-transitory computer readable media storing an algorithm for calculating a minimal disassembling time by a fitness function of the disassembling time of the plurality of components to determine an optimal disassembling sequence, and the optimal disassembling sequence being used for disassembling of the product, the algorithm comprising the following steps while being executed by a computer:
  randomly generating an initial disassembling sequence solution of the product, introducing the initial disassembling sequence solution to the fitness function for serving as a swarm optimal fitness value and storing the swarm optimal fitness value;
  updating the initial disassembling sequence solution to generate an update disassembling sequence solution of a new generation by an update mechanism and introducing the update disassembling sequence solution to the fitness function to calculate an update fitness value;
  comparing the update fitness value with the swarm optimal fitness value; if the update fitness value is smaller than the swarm optimal fitness value, replacing the initial disassembling sequence solution by the update disassembling sequence solution and updating the swarm optimal fitness value correspondingly, if not, maintaining the initial disassembling sequence solution;
  continuously updating the update disassembling sequence solution till a stopping criterion is satisfied and considering a last storing result of the swarm optimal fitness value as the optimal disassembling sequence of the product; and
  issuing a disassembling instruction such that the product is disassembled in accordance with the optimal disassembling sequence;
  wherein, the update mechanism is updated according to the following steps:
  generating a random probability value corresponding to the initial disassembling sequence solution by the processor, and the random probability value between 0 and 1;
  updating the initial disassembling sequence solution according to the following formula:

$$x_{ij}^{t+1} = \begin{cases} x_{ij}^t + \rho \cdot u_j & \text{if } x_{ij}^t = g_j \text{ or } \rho \in [0, C_r] \\ g_j + \rho \cdot u_j & \text{if } x_{ij}^t \neq g_j \text{ and } \rho \in [C_r, C_g] \\ x_{ij}^t + \rho \cdot (x_{ij}^t - g_j) & \text{if } x_{ij}^t \neq g_j \text{ and } \rho \in [C_g, 1] \end{cases}$$

wherein, $x_{ij}$ is $i^{th}$ solution of $j^{th}$ component in the initial disassembling sequence solution; t is a generation number; $\rho$ is the random probability value; $g_j$ is an optimal fitness value of the $j^{th}$ component; $u_j$ is an intervening variable, and the intervening variable is calculated by using a difference of an upper limit value and a lower limit value to divide a double amount of a component; $C_r$, an $C_g$ are applied to determine a predetermined threshold value in an update interval of the random probability value; and
  if an updated solution exceeds in the upper limit value or the lower limit value of the disassembling sequence, the upper limit value or the lower limit value is served as the update disassembling sequence solution of the next generation;
  wherein the product comprises electronic products and the electronic products are disassembled to the plurality of components comprising aluminum, plastic and steel according to the optimal disassembling sequence.

7. The non-transitory computer readable media of claim 6, wherein the plurality of disassembling attributes of the plurality of components comprise a disassembling direction, a disassembling method, a post-disassembling need and a component composition.

8. The non-transitory computer readable media of claim 7, wherein the fitness function of the disassembling attribute comprises the following formula:

$$F(X) = t_1 + \sum_{k=2}^{n} T(B_{j,k}) + \sum_{k=2}^{n} T(D_{j,k}) + \sum_{k=2}^{n} T(M_{j,k})$$

wherein, $t_1$ is a disassembling time of a component in a first disassembling sequence; $T(B_{j,k})$ is an updated disassembling time of the $j^{th}$ component after a second disassembling sequence; $T(D_{j,k})$ is a penalty time of the $j^{th}$ component changing the disassembling direction after the second disassembling sequence; and $T(M_{j,k})$ is a penalty time of the $j^{th}$ component changing the disassembling method after the second disassembling sequence.

9. The non-transitory computer readable media of claim 8, wherein an updated disassembling time comprises the following formula: $T(B_{j,k})=t_j k^{\infty}$
  wherein, is a learning index, and the disassembling time of the $j^{th}$ component in a $k^{th}$ disassembling sequence is updated by the learning index.

10. The non-transitory computer readable media of claim 6, wherein the stopping criterion comprises an updated number which is up to a predetermined generation number, a calculation time which is up to a predetermined processing time or the optimal fitness value which is not changed when the updated number exceeds a predetermined number.

* * * * *